US008605610B2

(12) United States Patent
Hwang et al.

(10) Patent No.: US 8,605,610 B2
(45) Date of Patent: Dec. 10, 2013

(54) METHOD AND APPARATUS FOR LINK ADAPTIVE MULTICAST/BROADCAST TRANSMISSION AND RECEPTION

(75) Inventors: Sung-Hyun Hwang, Daejeon (KR); Jin Soo Wang, Busan (KR); Jae Chul Park, Gyeonggi-Do (KR); Yun Hee Kim, Gyeonggi-Do (KR)

(73) Assignees: Electronics and Telecommunications Research Institute, Daejeon (KR); Industry Academic Cooperation Foundation Kyunghee University, Gyeonggi-do (KR)

( * ) Notice: Subject to any disclaimer, the term of this patent is extended or adjusted under 35 U.S.C. 154(b) by 770 days.

(21) Appl. No.: 12/731,370

(22) Filed: Mar. 25, 2010

(65) Prior Publication Data
US 2010/0246429 A1    Sep. 30, 2010

(30) Foreign Application Priority Data

Mar. 31, 2009   (KR) .......................... 10-2009-0027679

(51) Int. Cl.
*H04L 12/26* (2006.01)
*H04H 20/71* (2008.01)
*H04W 72/04* (2009.01)

(52) U.S. Cl.
USPC ........... 370/252; 370/312; 370/329; 370/432; 370/335; 455/69; 455/450

(58) Field of Classification Search
USPC ......... 370/203, 252, 208, 328, 312, 432, 390, 370/342–343, 335–336, 344–345, 329, 370/478–480
See application file for complete search history.

(56) References Cited

U.S. PATENT DOCUMENTS 7,406,063 B2 *  7/2008  Jung et al. ...................... 370/329
7,782,807 B2 *  8/2010  Yoon et al. ..................... 370/312
8,077,649 B2 * 12/2011  Cai ................................. 370/312

(Continued)

FOREIGN PATENT DOCUMENTS

KR     1020080096513 A    10/2008

OTHER PUBLICATIONS

Jose Villalon, et al; "Cross-Layer Architecture for Adaptive Video Multicast Streaming Over Multirate Wireless LANs", IEEE Journal on Selected Areas in Communications, vol. 25, No. 4, May 2007, (exact date not given) pp. 699-711.

*Primary Examiner* — Candal Elpenord
(74) *Attorney, Agent, or Firm* — Ladas & Parry LLP

(57) ABSTRACT

A method and apparatus for adaptively transmitting the same data, i.e., multicast/broadcast data, according to channel quality to a receiving group including one or more terminals that request the same service in a wireless network. A base station obtains feedback on channel quality indications (CQIs) from a plurality of terminals, selects a transmission technique that satisfies desired service quality based on the CQIs, and transmits data to the terminals included in a receiving group by using the selected transmission technique. The CQIs to be transmitted from the terminals in the receiving group to the base station are transmitted through a previously allocated common CQI feedback channel. In the present invention, in order to reduce a CQI feedback channel capacity, the base station does not allocate a common CQI feedback channel with respect to each reception terminal and allocates radio resources according to CQI levels. As radio resources are allocated according to CQI levels, a CQI feedback channel capacity may not be increased even when the number of terminals in the receiving group is increased and adaptive transmission may be efficiently performed.

19 Claims, 6 Drawing Sheets

(56) References Cited

U.S. PATENT DOCUMENTS

| | | | |
|---|---|---|---|
| 8,488,520 B2 * | 7/2013 | Awad et al. | 370/328 |
| 8,498,270 B2 * | 7/2013 | Iwamura et al. | 370/332 |
| 2006/0146920 A1 * | 7/2006 | Suh et al. | 375/221 |
| 2007/0177555 A1 * | 8/2007 | Brueck et al. | 370/338 |
| 2008/0019307 A1 | 1/2008 | Tenny et al. | |
| 2008/0165717 A1 | 7/2008 | Chen et al. | |
| 2009/0196165 A1 * | 8/2009 | Morimoto et al. | 370/208 |
| 2009/0276674 A1 * | 11/2009 | Wei et al. | 714/749 |
| 2009/0323577 A1 * | 12/2009 | Agrawal et al. | 370/312 |
| 2010/0014500 A1 * | 1/2010 | Lee et al. | 370/342 |
| 2010/0177713 A1 * | 7/2010 | Yoshii et al. | 370/329 |

* cited by examiner

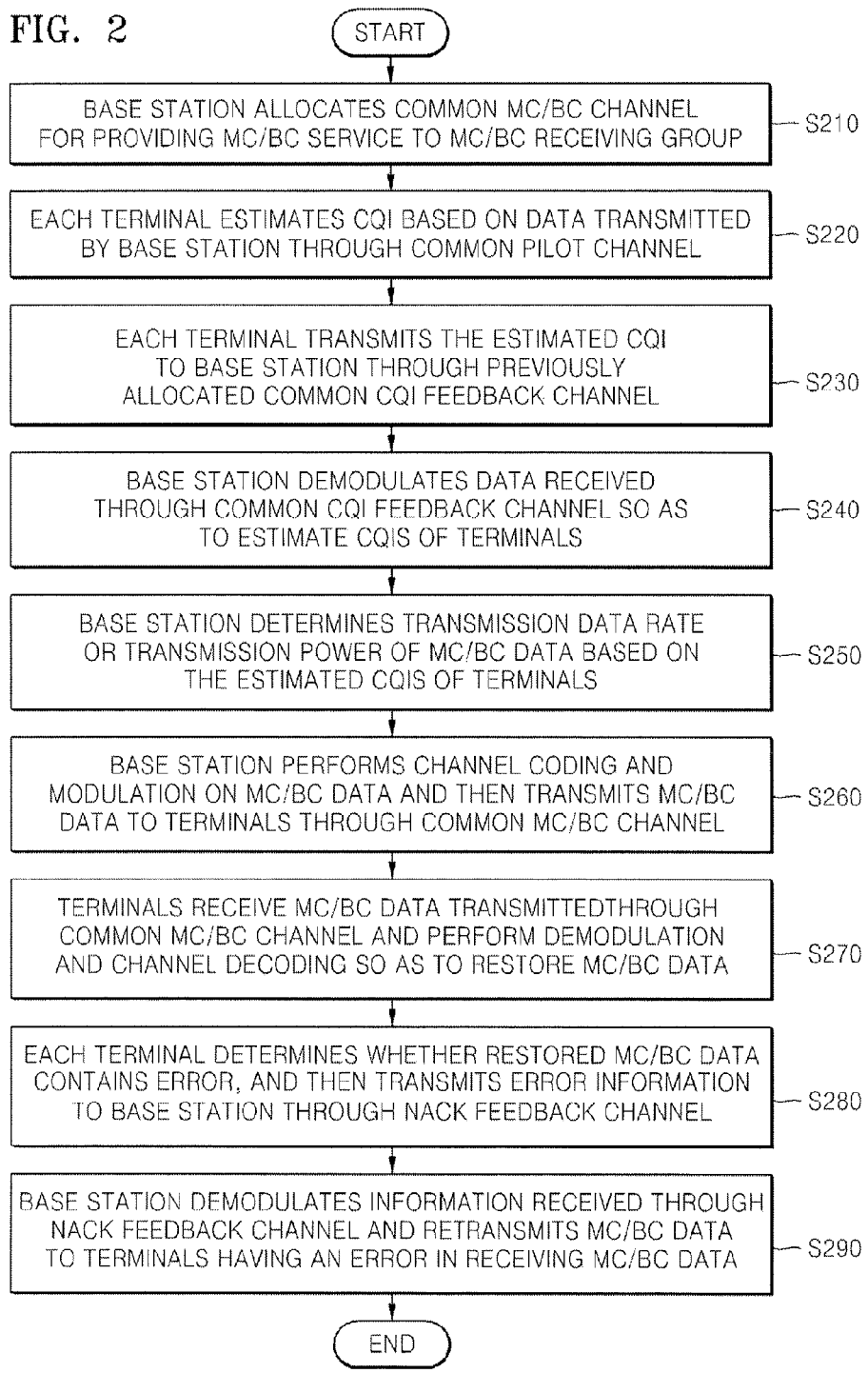

Time slot allocation

Subcarrier group allocation

Time (frequency) mapping

Code mapping

METHOD AND APPARATUS FOR LINK ADAPTIVE MULTICAST/BROADCAST TRANSMISSION AND RECEPTION

CROSS-REFERENCE TO RELATED PATENT APPLICATION

This application claims the benefit of Korean Patent Application No. 10-2009-0027679, filed on Mar. 31, 2009, in the Korean Intellectual Property Office, the disclosure of which is incorporated herein in its entirety by reference.

BACKGROUND OF THE INVENTION

1. Field of the Invention

The present invention relates to a method and apparatus for link adaptive multicast/broadcast transmission and reception, and more particularly, to a method and apparatus for efficient delivery of multicast/broadcast data in a wireless network.

2. Description of the Related Art

A multicast/broadcast transmission method in a wireless communication system is a method of simultaneously transmitting multimedia data such as audio or video data to a plurality of receivers through a common channel, and also is an efficient method of simultaneously transmitting multimedia data to a plurality of users.

Well-known examples of the multicast/broadcast transmission method include a multimedia broadcast and multicast service (MBMS) method in 3rd-generation partnership project (3GPP) universal mobile telecommunications systems (UMTS) and long term evolution (LTE) networks, a broadcast multicast service (BCMCS) method in 3rd-generation partnership project 2 (3GPP2) code division multiple access (CDMA) 2000 networks, a multicast broadcast service (MBS) method in worldwide interoperability for microwave access (WiMAX) networks, and a broadcast and multicast transmission method in IEEE 802.11 wireless local area networks (LANs).

In a conventional multicast/broadcast transmission method in a wireless network (3GPP UMTS, IEEE 802.11), unidirectional transmission is made from a transmitter (base station, access point (AP)) to a receiver (terminal, mobile station, user device). Due to the unidirectional transmission, the receiver cannot notify the transmitter about whether data is successfully received or not.

The performance of this conventional multicast/broadcast transmission method can be improved by improving the reception quality of a subscriber terminal located where reception quality is poor (for example, a cell border). For example, a transmission diversity technique and a multiple base station transmission technique may be used.

In order to satisfy service quality desired by subscriber terminals that receive a service, a feedback channel is requested between receivers and a base station. In order words, a feedback channel for reporting the reception status of multicast/broadcast data from a terminal, i.e., a receiver, to a base station is requested.

As such, in a new wireless system standard, a method of allocating an uplink (reverse link) channel for reporting reception quality from a terminal to a base station and adaptively transmitting data from the base station based on the reported reception quality is being researched.

First, in a 3GPP LTE network method, a base station transmits MBMS data only when a terminal in a cell area requests a predetermined MBMS service and the number of service-requesting receivers is detected whenever an MBMS service is provided.

As a base station allocates a different code signal with respect to each MBMS service and a terminal transmits to the base station a different code signal with respect to each requested service, the base station may detect whether a service-requesting terminal exists and the number of service-requesting terminals with respect to each service.

Second, in a multicast/broadcast data service group method, terminals notify a base station about a reception status of each data block and if a terminal does not receive a predetermined data block, the base station retransmits the data block to the terminal.

For this, the base station allocates an uplink resource block related to each downlink data block for transmitting multicast/broadcast data.

Terminals that do not receive a data block transmit to the base station a reception failure of the downlink data block, i.e., a negative acknowledgement (NACK) message, included in the allocated uplink resource block.

If a NACK message is received from a terminal, the base station retransmits a corresponding transmission data block to the terminal. If the number of terminals that transmit NACK messages is known, the base station retransmits a transmission data block having a large number of NACK messages from terminals with priority.

As described above, a multicast/broadcast service method in a wireless network includes a method of reporting a data reception status of a service receiving group to a base station and retransmitting data from the base station to terminals according to the report.

A method of reporting the channel status or the channel quality from each receiver in a receiving group to a transmitter and performing adaptive modulation or adaptive controlling of the date rate or transmission power by using the transmitter based on the reported quality has not yet been suggested.

However, an example of an adaptive multicast data transmission method in a wireless LAN environment includes a method of determining a data rate by using a transmitter based on the minimum value of a signal-to-noise ratio (SNR) of receivers in a receiving group.

In this method, the data rate of multicast data is varied according to a carrier sensing multiple access/collision avoidance (CSMA/CA) protocol, an AP broadcasts a multicast probing channel, terminals in a multicast receiving group measure a reception SNR through the probing channel, and terminals having a low reception SNR respond faster than terminals having a relatively higher SNR.

The fastest responding terminal becomes a leader of the multicast receiving group, a transmitter determines a transmission data rate based on the SNR of the leader, and only the leader transmits a data reception failure message, i.e., a NACK message to the transmitter.

The above-described conventional method can prevent collision between terminals and satisfy service quality to a certain degree by allowing a terminal having the lowest SNR to report reception SNR and to transmit a NACK message.

However, if two terminals have similar reception SNRs, pieces of channel quality feedback information may collide with each other and non-leader terminals may not transmit a NACK message. Thus, if an SNR of a non-leader terminal suddenly deteriorates or an error occurs in receiving data, the service quality of a corresponding terminal cannot be satisfied.

Also, since this method is based on a CSMA/CA protocol, resource reservation or allocation for data transmission is not efficient.

SUMMARY OF THE INVENTION

The present invention provides a method and apparatus for adaptively changing a data transmission rate or transmission power for a base station based on the channel quality of a multicast/broadcast receiving group in a wireless network that reserves or allocates radio resources, or allocating a common channel quality indication (CQI) feedback channel, through which a receiving group terminal may provide reception quality feedback to the base station, and transmitting and detecting a CQI.

According to an aspect of the present invention, there is provided an apparatus for receiving multicast/broadcast data, the apparatus including a channel quality indication (CQI) estimation unit for estimating a CQI of a terminal based on known symbols received through a common pilot channel; a CQI transmission unit for allocating a predetermined signal waveform according to the CQI of the terminal and transmitting the predetermined signal waveform through a previously set common CQI feedback channel; and a data reception unit for receiving multicast/broadcast data according to an adaptive modulation and coding (AMC) option selected.

According to another aspect of the present invention, there is provided an apparatus for transmitting adaptive multicast/broadcast data, the apparatus including a CQI detection unit for detecting channel quality indications (CQIs) of terminals included in a multicast/broadcast service group from received signal waveforms; a controller for selecting an adaptive modulation and coding (AMC) option based on the detected CQIs of the terminals; and a data transmission unit for transmitting the multicast/broadcast data by performing channel coding and modulation to based on the AMC option selected by the controller.

According to another aspect of the present invention, there is provided a method of receiving multicast/broadcast data adaptively, the method including receiving known symbols through a common pilot channel; estimating the received SNR of a terminal based on the known symbols and mapping the received SNR to a CQI level; allocating a predetermined signal waveform according to the CQI of the terminal and transmitting the predetermined signal waveform through a previously set common CQI feedback channel; and receiving multicast/broadcast data according to an AMC option selected at the base station.

According to another aspect of the present invention, there is provided a method of transmitting multicast/broadcast data adaptively, the method including receiving a sum of predetermined signal waveforms having a channel quality indication (CQI) of each terminal from terminals included in a multicast/broadcast service group via a common CQI feedback channel; restoring the CQIs from the received signal via the common CQI feedback channel; and transmitting the multicast/broadcast data based on an AMC option selected based on the restored CQIs of the terminals.

BRIEF DESCRIPTION OF THE DRAWINGS

The above and other features and advantages of the present invention will become more apparent by describing in detail exemplary embodiments thereof with reference to the attached drawings in which:

FIG. 2 is a flowchart of a method for adaptive transmission and reception of multicast/broadcast data, according to an embodiment of the present invention;

DETAILED DESCRIPTION OF THE INVENTION

Hereinafter, the present invention will be described in detail by explaining embodiments of the invention with reference to the attached drawings.

A method and apparatus for adaptive transmission and reception of multicast/broadcast data, according to embodiments of the present invention, can be applied to a wireless network that reserves and allocates radio resources.

A cellular network-based service will be exemplarily described below. However, it will be understood by those of ordinary skill in the art that the present invention is not limited to a cellular network-based service and that various changes may be made without departing from the spirit and scope of the present invention.

Figure 1:
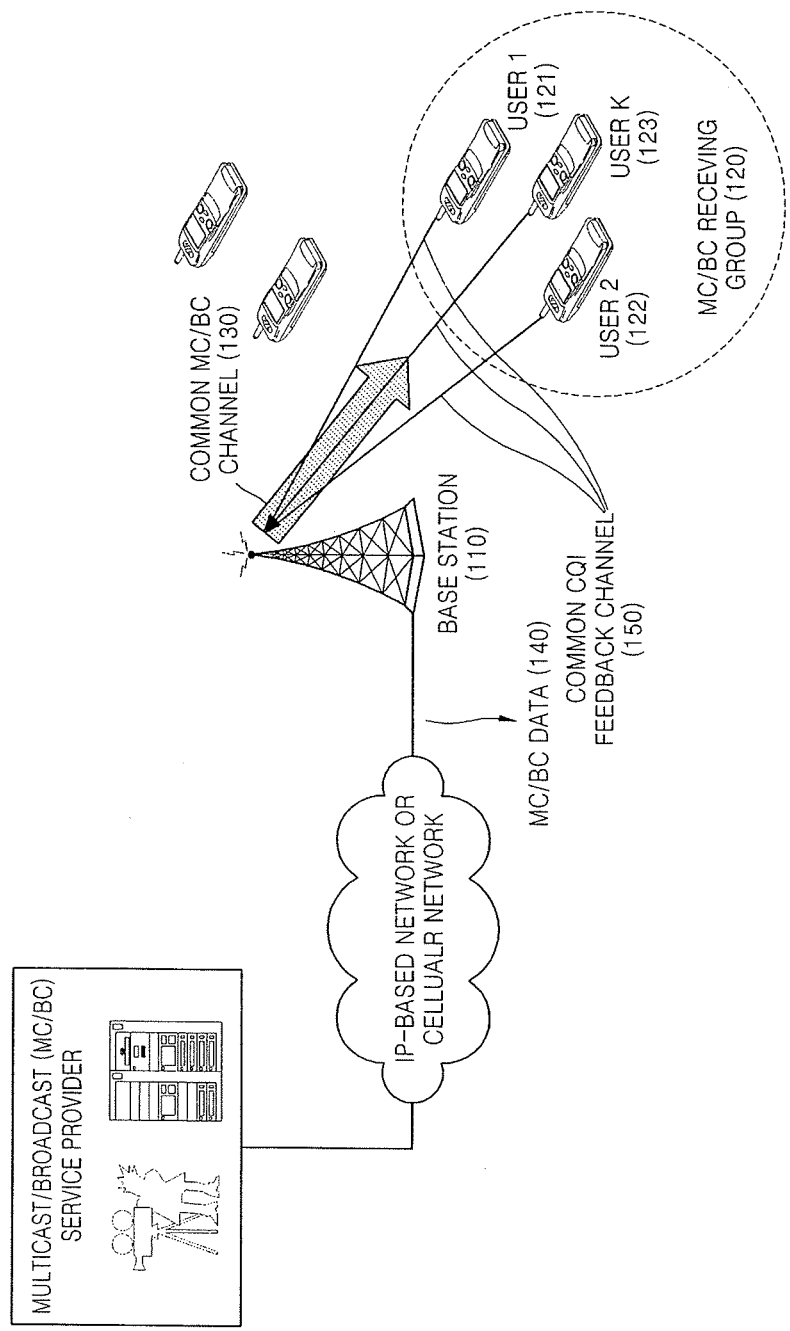
FIG. 1 is a diagram showing a multicast/broadcast service process in a wireless network.

FIG. 1 is a diagram showing a multicast/broadcast service process in a wireless network.

Referring to FIG. 1, multicast/broadcast transmission in the wireless network is performed between a base station 110 and a multicast/broadcast receiving group 120 including one or more terminals for requesting a multicast/broadcast service, such as, first through Kth terminals User1 121 through UserK 123.

The base station 110 transmits multicast/broadcast data 140 through a common multicast/broadcast channel 130 to the first through Kth terminals User1 121 through UserK 123 included in the multicast/broadcast receiving group 120.

A common channel quality indication (CQI) feedback channel 150 transmits CQI data of the first through Kth terminals User1 121 through UserK 123 included in the multicast/broadcast receiving group 120, to the base station 110.

FIG. 2 is a flowchart of a method for adaptive transmission and reception of multicast/broadcast data, according to an embodiment of the present invention. FIG. 2 will be described in conjunction with FIG. 1.

Referring to FIG. 2, in the adaptive multicast/broadcast service, the base station 110 allocates the common multicast/broadcast channel 130 and the common CQI feedback channel 150 for providing a multicast/broadcast service to the multicast/broadcast receiving group 120 (operation S210).

Each of the first through Kth terminals User1 121 through UserK 123 included in the multicast/broadcast receiving group 120 estimates a CQI based on known symbols transmitted by the base station 110 through a common pilot channel (operation S220).

Each of the first through Kth terminals User1 121 through UserK 123 transmits a signal containing the CQI to the base station 110 through the previously allocated common CQI feedback channel 150 (operation S230).

The base station 110 demodulates the signal received through the common CQI feedback channel 150 so as to estimate CQIs of the first through Kth terminals User1 121 through UserK 123 (operation S240).

The base station 110 determines a transmission data rate given by an adaptive modulation and coding (AMC) option in general or transmission power of the multicast/broadcast data 140 based on the estimated CQIs of the first through Kth terminals User1 121 through UserK 123 (operation S250). The base station 110 performs channel coding and modulation on the multicast/broadcast data 140 and then transmits the multicast/broadcast data 140 to the first through Kth terminals User1 121 through UserK 123 through the common multicast/broadcast channel 130 (operation S260).

The first through Kth terminals User1 121 through UserK 123 receive the multicast/broadcast data 140 transmitted through the common multicast/broadcast channel 130 and perform demodulation and channel decoding so as to restore the multicast/broadcast data 140 (operation S270).

Meanwhile, if the multicast/broadcast data 140 restored by the first through Kth terminals User1 121 through UserK 123 contains an error, operation S280 may be further performed.

In this regard, each of the first through Kth terminals User1 121 through UserK 123 determines whether the restored multicast/broadcast data 140 contains an error, and transmits information regarding whether an error is present or not to the base station 110 through a negative acknowledgement (NACK) feedback channel (operation S280).

The base station 110 demodulates the information received through the NACK feedback channel and retransmits the multicast/broadcast data 140 to terminals having an error in receiving the multicast/broadcast data 140 from among the first through Kth terminals User1 121 through UserK 123 (operation S290).

The multicast/broadcast data 140 is checked for errors by checking a cyclic redundancy check (CRC) bit added to the multicast/broadcast data 140.

Figure 3A:
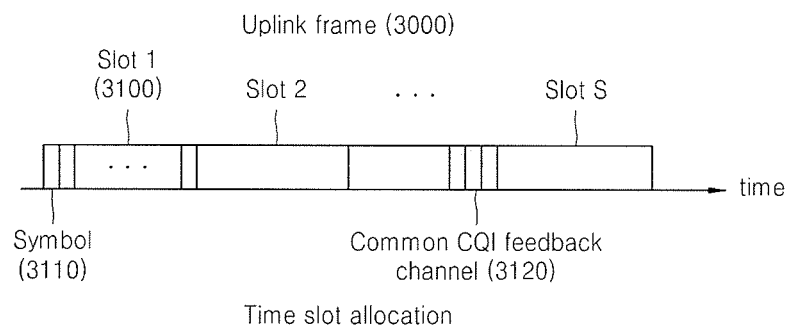
FIGS. 3A and 3B are diagrams for describing a method of allocating a common channel quality indication (CQI) feedback channel illustrated in FIG. 1, according to an embodiment of the present invention.
Figure 3B:
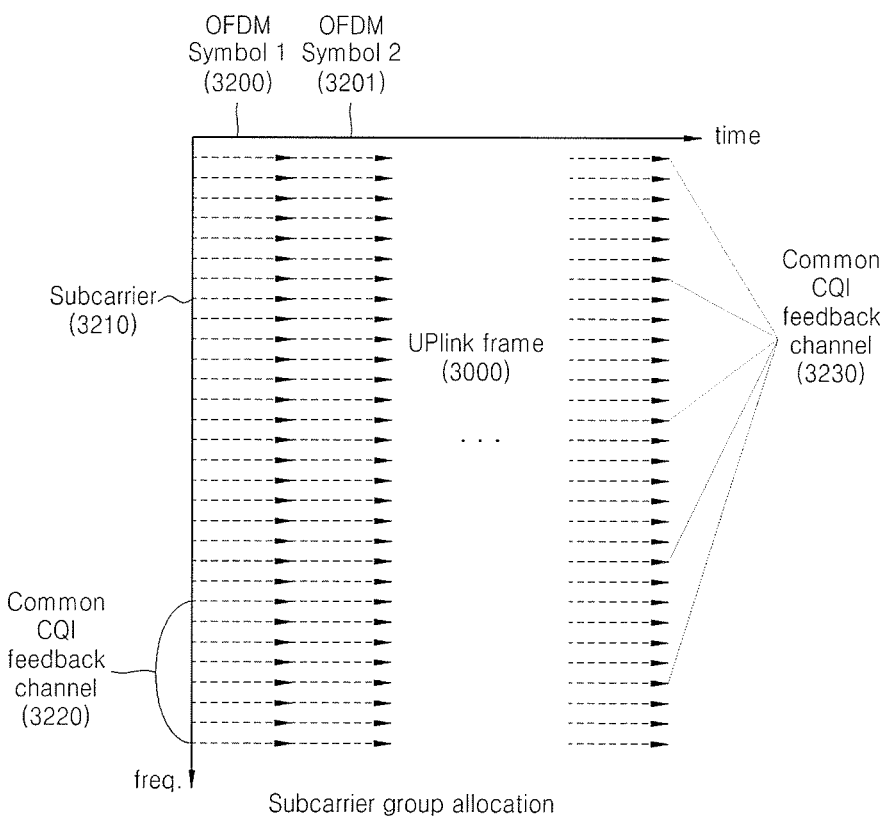

FIGS. 3A and 3B are diagrams for describing a method of allocating the common CQI feedback channel 150 illustrated in FIG. 1, according to an embodiment of the present invention. FIGS. 3A and 3B will be described in conjunction with FIG. 1.

The common CQI feedback channel 150 from the first through Kth terminals User1 121 through UserK 123 included in the multicast/broadcast receiving group 120 to the base station 110 may be formed by using a time division multiplexing (TDM) method, an orthogonal frequency division multiplexing (OFDM) method, or a code division multiple access (CDMA) method.

FIGS. 3A and 3B exemplarily illustrate a case when the first through Kth terminals User1 121 through UserK 123 transmit CQIs to the base station 110.

FIG. 3A exemplarily illustrates a method of allocating the common CQI feedback channel 150 in a TDM method.

Referring to FIG. 3A, a portion of an uplink frame 3000 transmitted from the first through Kth terminals User1 121 through UserK 123 to the base station 110, e.g., 3120, is allocated as the common CQI feedback channel 150.

A portion or the whole of a predetermined time slot 3100 consisting of a plurality of symbols 3110 may be the common CQI feedback channel 3120.

FIG. 3B exemplarily illustrates a method of allocating the common CQI feedback channel 150 in an OFDM method.

Referring to FIG. 3B, symbols of the uplink frame 3000 may be single-carrier modulation symbols or OFDM symbols 3200 and 3201. The OFDM symbols 3200 and 3201 will be representatively described.

If the OFDM method is applied to the OFDM symbols 3200 and 3201 of the uplink frame 3000, a predetermined subcarrier group of subcarriers 3210 of one or more of the OFDM symbols 3200 and 3201 are allocated as a common CQI feedback channel 3220 or 3230.

In more detail, a group of the subcarriers 3210 having neighboring frequencies as the common CQI feedback channel 3220 or a group of the subcarriers 3210 having distributed frequencies may be allocated may allocate as the common CQI feedback channel 3230.

A method of transmitting CQIs through the common CQI feedback channel (150, 3120, 3220, or 3230) from the first through Kth terminals User1 121 through UserK 123 of the multicast/broadcast receiving group 120, according to an embodiment of the present invention, will now be described.

All terminals have predetermined signal-to-noise ratio (SNR) thresholds $\{\Gamma_m, m=0, 1, 2 \ldots, M\}$, where $\Gamma_0 = -\infty$ and $\Gamma_m < \Gamma_{m+1}$. All terminals know (or are informed of) the starting time of the common CQI feedback channel. The common CQI feedback channel is used for transmission some part of M signal waveforms $\{s_m(t), m=1, 2, \ldots, M\}$ representing different CQI levels. M signal waveforms $\{s_m(t), m=1, 2, \ldots, M\}$ may be orthogonal to each other or may correspond to each other with a correlation coefficient close to a value 0.

(Step 1) Each of the first through Kth terminals User1 121 through UserK 123 of the multicast/broadcast receiving group 120 estimates the received SNR $\gamma_k$ using the known symbols of a common pilot channel.

(Step 2) If the received SNR $\gamma_k$ of the kth terminal lies in $\Gamma_{m_k-1} \leq \gamma_k < \Gamma_{m_k}$, the CQI of the kth terminal is decided as $m_k$ and the kth terminal transmits the signal waveform $S_{m_k}(t)$ over the common CQI feedback channel.

Since terminals of the multicast/broadcast receiving group 120 illustrated in FIG. 1 are synchronized with each other in time and frequency to transmit uplink data, if each of the terminals transmits a CQI signal through the common feedback channel, the CQI signal received by the base station 110 illustrated in FIG. 1 may be represented by Equation 1 in a flat fading environment.

$$r(t) = \sum_{k=1}^{K} \alpha_k s_{m_k}(t) + w(t)$$

$$= \sum_{k=1}^{K} \alpha_k \sum_{m=1}^{M} I_{k,m} s_m(t) + w(t)'$$

[Equation 1]

where K represents the number of terminals included in the multicast/broadcast receiving group 120, $I_{k,m}$ is an indicator function that indicates a value 1 when the kth terminal selects the CQI m and indicates a value 0 when the kth terminal does not select the CQI m, $\alpha_k$ represents a complex fading amplitude of the kth terminal, $s_m(t)$ represents a signal waveform corresponding to the CQI m transmitted over the common CQI feedback channel, and w(t) represents the additive noise.

In a method of transmitting CQIs of terminals, according to an embodiment of the present invention, a signal waveform $s_m(t)$ can be designed with a predetermined symbol time in a TDM method or a predetermined subcarrier set in an OFDM method, and may transmit together with a predetermined code sequence orthogonal to the signal waveform $s_m(t)$.

The signal waveforms constructed by a TDM method might be represented exemplarily by $$s_m(t) = \begin{cases} A, & \text{if } (m-1)\frac{T_F}{M} \le t < m\frac{T_F}{M} \\ 0, & \text{otherwise,} \end{cases}$$ [Equation 2]

for $m = 1, 2, \ldots, M$, where $T_F$ is the time duration of the common CQI feedback channel and $T_F$ is the signal amplitude.

[Equation 3]

The signal waveforms constructed by an OFDM method might be represented exemplarily by $$s_m(t) = A \sum_{k \in C_m} e^{j2\pi kt/T}, 0 \le t < T + T_G, \text{ for } m = 1, 2, \ldots, M,$$

where $1/T$ is the subcarrier spacing, $T_G$ is the guard time, and $C_m$ is the index set of subcarriers allocated to the mth signal waveform such that $C_m \cap C_{m'} = \emptyset$ for $m \ne m'$.

The signal waveforms constructed by a CDMA method might be represented exemplarily by $$s_m(t) = A \sum_{n=0}^{N-1} C_{m,n} p(t - nT_c), \text{ for } m = 1, 2, \ldots, M,$$ [Equation 4]

where $C_{m,n}$ is the chip of the mth sequence of length N, $T_C = T_F/N$ is the chip duration, and $$p(t) = \begin{cases} 1, & \text{if } 0 \le t < T_c \\ 0, & \text{otherwise} \end{cases}$$

is the chip waveform.

Figure 4A:
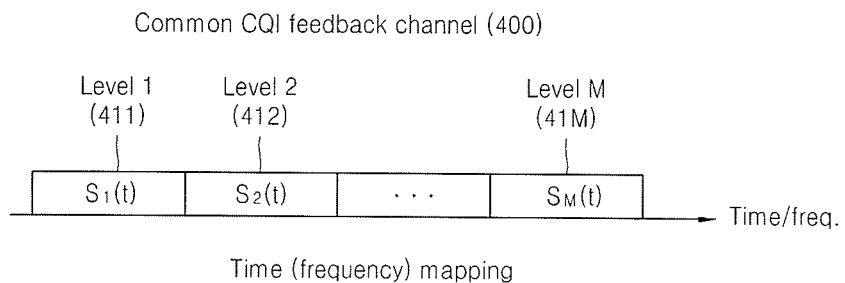
FIGS. 4A and 4B are diagrams showing signal mapping with respect to CQI levels of a common CQI feedback channel, according to an embodiment of the present invention.
Figure 4B:
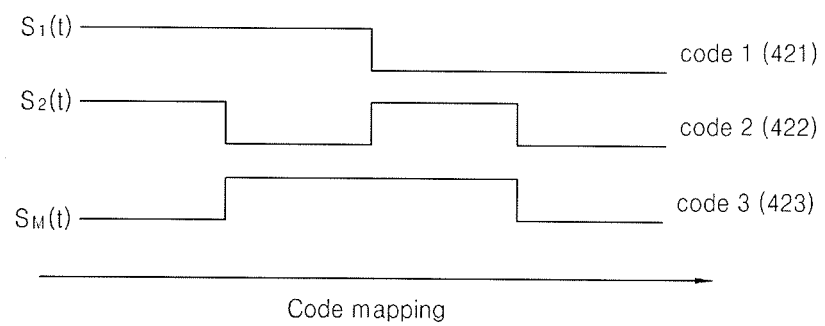

FIGS. 4A and 4B are diagrams showing the resources (signal waveforms) representing the CQI levels in a common CQI feedback channel 400, according to an embodiment of the present invention.

FIG. 4A illustrates a case when the signal waveforms {$s_m$(t), m=1, 2, ..., M} correspond to first through Mth levels 411 through 41M that do not overlap each other in time as in [Equation 2] or frequency (subcarrier) as in [Equation 3] and FIG. 4B shows an example of signal waveforms {$s_m$(t), m=1, 2, ..., M} corresponding to CQI levels in a CDMA method as in Equation [4].

In the current embodiment, the base station 110 is interested in CQI distributions or the worst value from among CQIs of the multicast/broadcast receiving group 120, rather than a CQI of each terminal.

Thus, the base station 110 detects whether a CQI m is transmitted by any terminal or not by detecting the existence of $s_m$(t) in the received signal during the common CQI feedback channel. The existence of $s_m$(t) can be determined by using a correlation represented by Equation 5.

$$Z_m = \int r(t) s_m(t) dt = c \left[ \sum_{k=1}^{K} I_{k,m} \alpha_k \right] + w',$$ [Equation 5]

where c represents a constant related to a signal energy and w' represents a correlator output of noise.

In other words, if there is no terminal that transmits CQI m, the correlation output is given by $Z_m = w'$ and thus only noise exists. If there is a terminal that transmits the signal waveform corresponding to CQI m, a corresponding signal component exists as $$Z_m = c \left( \sum_{k \in A_m} \alpha_k \right) + w',$$

where $A_m$ is the index set of the terminals transmitting the signal waveform corresponding to CQI m.

Thus, the base station 110 determines whether there is a terminal that transmits the CQI m or not by using a correlator output energy ($|Z_m|^2$).

If the downlink from the base station 110 to terminals and the uplink from the terminals to the base station 110 use the same frequency, the channel quality from a terminal to the base station 110 is similar to that from the base station 110 to the terminal when the channel varies slowly.

If a terminal selects a low CQI level corresponding to a low SNR value and transmits the signal waveform corresponding to the selected CQI level, the signal waveform received at the base station 110 via the common CQI feedback channel 400 can also have a low SNR due to the channel reciprocity.

Although the downlink data transmitted from the base station 110 to the terminals and the uplink data transmitted from the terminals to the base station 110 use different frequencies, in consideration of path loss, if downlink quality is inferior, uplink quality may also be inferior.

Figure 5:
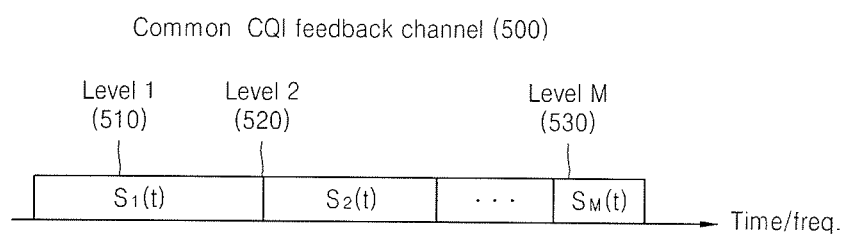
FIG. 5 is a diagram showing signal mapping with respect to CQI levels of a common CQI feedback channel, according to another embodiment of the present invention.

FIG. 5 is a diagram showing signal mapping with respect to CQI levels of a common CQI feedback channel 500, according to another embodiment of the present invention.

A method of mapping signal waveforms having different performances according to CQI levels of the common CQI feedback channel 500 is described with reference to FIG. 5.

Referring to FIG. 5, in consideration that reception quality is uneven according to CQIs of terminals, each terminal may use a mapping method of improving reception quality of a signal waveform $S_m$(t) representing a CQI corresponding to a low SNR level.

For example, a terminal may allocate more time or frequency resources to a signal waveform $s_m$(t) representing a low CQI level, e.g., a first level 510 and may allocate less time or frequency resources as the CQI level increases to second through Mth levels 520 through 530.

If a terminal transmits a code sequence signal waveform $s_m$(t) corresponding to a CQI level, more code sequences may be allocated with respect to a low CQI level.

The SNR thresholds {$\Gamma_m$, m=0, 1, 2 ..., M} can be determined by the SNR thresholds used for choosing L adaptive modulation and coding (AMC) options. In this case, the number L of AMC options is the same as the number M of CQIs.

In order to transmit CQIs, terminals of the multicast/broadcast receiving group 120 measure a received SNR by using a common pilot channel and determine an AMC option m that satisfies a target packet error rate based on the measured SNR.

In another example, we can apply the SNR thresholds $\{\Gamma_m, m=0, 1, 2 \ldots, M\}$ finer than those for the AMC options with M>L.

In order to transmit CQIs, terminals of the multicast/broadcast receiving group 120 measure and quantize the received SNR by using a common pilot channel.

A plurality of different techniques may be used when the received SNR is quantized. For example, a technique for reducing the number of levels or a technique for more efficiently representing a frequently used level may be used.

The above method of transmitting different waveforms $s_{m_k}(t)$ according to CQI levels over a common CQI feedback channel is different from a conventional unicast transmission method in which a feedback channel for reporting a CQI is independently allocated to each terminal and only a corresponding terminal can give CQI feedback through the allocated feedback channel. The conventional method is more effective when the number of terminal in a multicast/broadcast receiving group is relatively smaller than the number of CQI levels.

According to an embodiment of the present invention, a method of transmitting a different signal waveform $s_m(t)$ corresponding to a CQI through the common CQI feedback channel 500 according to the number of terminals in a multicast/broadcast receiving group or a method of transmitting a CQI of each terminal through an independent channel may be selected.

In more detail, when a small number of terminals are included in the multicast/broadcast receiving group 120 illustrated in FIG. 1, the method of transmitting a CQI through an independent channel is more efficient than the method of transmitting a different signal waveform $s_m(t)$ according to a CQI level through the common CQI feedback channel 500 due to a smaller feedback channel capacity.

The base station 110 illustrated in FIG. 1 determines whether each CQI level is transmitted from the terminals or not and determines the lowest CQI of the transmitted CQIs as an adaptive transmission parameter.

When a CQI level is determined as an AMC option, the base station 110 determines the lowest CQI level (AMC option) among the detected CQIs as an adaptive transmission parameter, i.e., an AMC option of data transmitted from the base station 110 to the terminals.

When a CQI level is determined by quantizing an SNR, the base station 110 selects the AMC option corresponding to the lowest CQI level (SNR value) among the detected CQIs as an adaptive transmission parameter, i.e., an AMC option of data transmitted from the base station 110 to the terminals.

If a wireless network system supports power control, the base station 110 may select the AMC option corresponding to the lowest CQI level (SNR value) from the detected CQIs as an adaptive transmission parameter, i.e., an AMC option, and may perform power control for remaining power.

According to an embodiment of the present invention, an adaptive transmission technique according to CQI levels may include a retransmission technique.

If an error occurs in the multicast/broadcast data 140 illustrated in FIG. 1, which is restored by terminals included in the multicast/broadcast receiving group 120, the base station 110 allocates a common NACK feedback channel for receiving information regarding whether an error occurs or not from the terminals.

In a method of transmitting a NACK message through the common NACK feedback channel, the NACK message is transmitted only when an error is detected from the multicast/broadcast data 140 by the terminals included in the multicast/broadcast receiving group 120.

The base station 110 detects whether an NACK message is transmitted from the common NACK feedback channel or not and, if the NACK message is transmitted, the base station 110 retransmits the multicast/broadcast data 140 to the terminal that transmits the NACK message.

Figure 6:
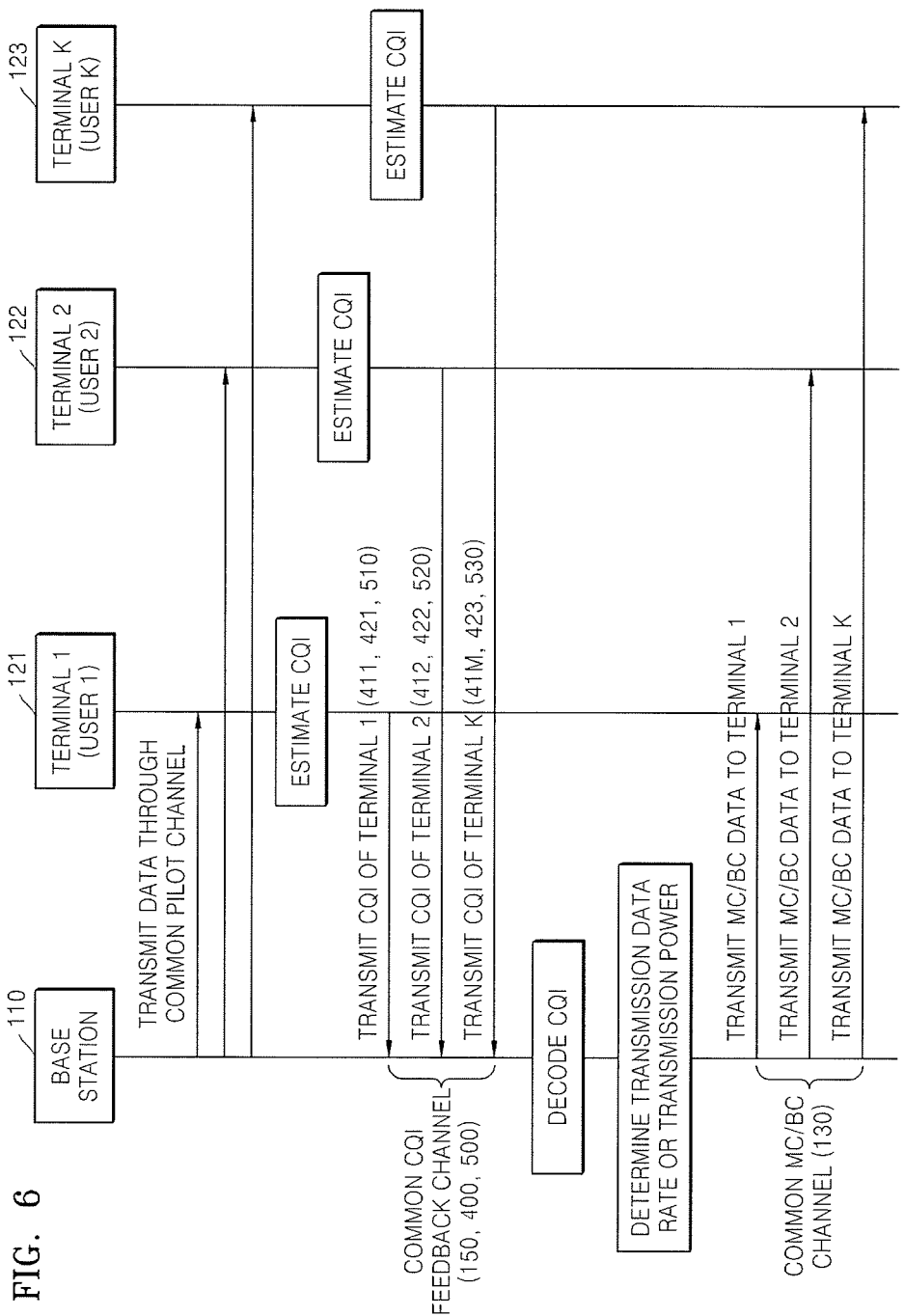
FIG. 6 is a diagram for describing a signal transmission process between a base station and terminals in providing a multicast/broadcast service, according to another embodiment of the present invention.

FIG. 6 is a diagram for describing a signal transmission process between a base station 110 and first through Kth terminals User1 121 through UserK 123 illustrated in FIG. 1 in providing a multicast/broadcast service, according to another embodiment of the present invention. FIG. 6 will be described in conjunction with FIGS. 1, 4, and 5.

Referring to FIG. 6, the base station 110 transmits known symbols to the first through Kth terminals User1 121 through UserK 123 through a common pilot channel.

Each of the first through Kth terminals User1 121 through UserK 123 included in the multicast/broadcast receiving group 120 estimates a CQI based on the known symbols received through the common pilot channel.

The CQI is transmitted by a different signal waveform (1) according to the number of AMC options or (2) according to the number of quantized levels of a reception SNR.

Each of the first through Kth terminals User1 121 through UserK 123 transmits its CQI to the base station 110 through the previously allocated common CQI feedback channel 150 400 or 500.

The base station 110 demodulates the signal received through the common CQI feedback channel 150 or 400 or 500 so as to estimate CQIs of the first through Kth terminals User1 121 through UserK 123.

The base station 110 determines a transmission data rate (AMC option) or transmission power of the multicast/broadcast data 140 based on the estimated CQIs of the first through Kth terminals User1 121 through UserK 123.

The base station 110 performs channel coding and modulation on the multicast/broadcast data 140 corresponding to the AMC option determined and then transmits the multicast/broadcast data 140 to the first through Kth terminals User1 121 through UserK 123 through the common multicast/broadcast channel 130.

The first through Kth terminals User1 121 through UserK 123 receive the multicast/broadcast data 140 transmitted through the common multicast/broadcast channel 130 and perform demodulation and channel decoding so as to restore the multicast/broadcast data 140.

Figure 7:
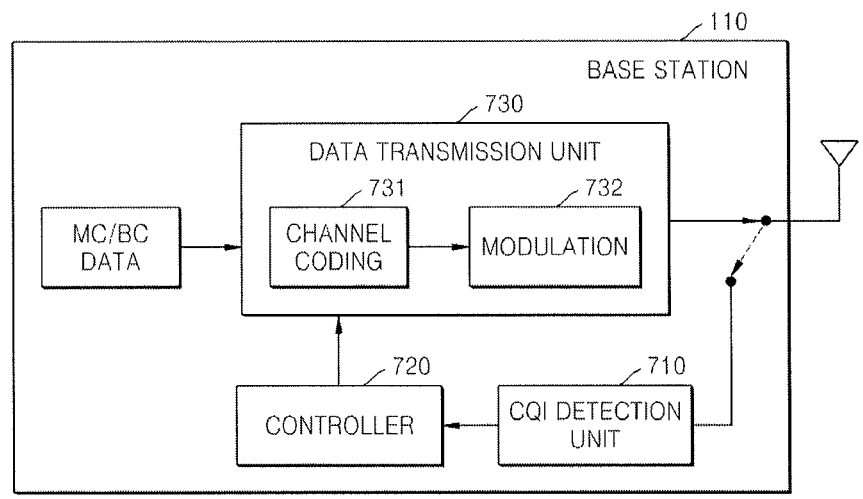
FIG. 7 is a block diagram of a base station in the wireless network illustrated in FIG. 1, according to an embodiment of the present invention.

FIG. 7 is a block diagram of the base station 110 illustrated in FIG. 1, according to an embodiment of the present invention. FIG. 7 will be described in conjunction with FIG. 1.

The base station 110 provides a service to one or more terminals by transmitting the multicast/broadcast data 140 through the common multicast/broadcast channel 130.

Referring to FIG. 7, the base station 110 includes a CQI detection unit 710, a controller 720, and a data transmission unit 730.

The CQI detection unit 710 receives the signal waveforms containing CQIs from terminals included in the multicast/broadcast receiving group 120 and detects the existence of each CQI level in the received signal using the predetermined signal waveforms one-to-one mapped to each CQI level.

The controller 720 selects an AMC option of the multicast/broadcast data 140 from CQIs detected by the CQI detection unit 710 for the transmission unit 730.

The transmission unit 730 performs channel encoding 731 and modulation 732 of the multicast/broadcast data 140 based on the option selected by the controller 730 and transmits the modulation output over the multicast/broadcast channel.

The AMC option of the multicast/broadcast data 140 is selected based on the lowest CQI level from among a plurality of CQI levels.

Figure 8:
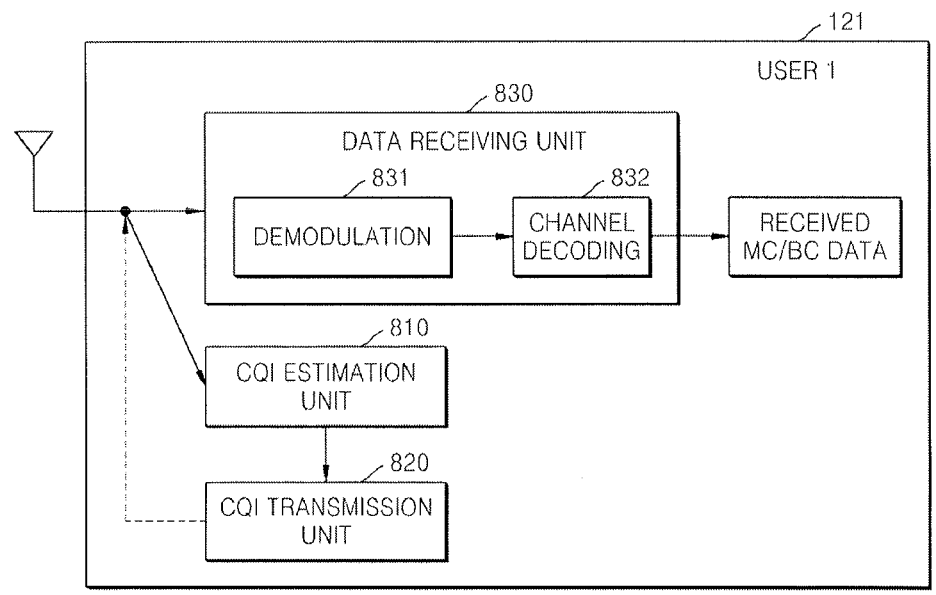
FIG. 8 is a block diagram of a terminal included in a multicast/broadcast receiving group, according to another embodiment of the present invention.

FIG. 8 is a block diagram of the first terminal User1 121 included in the multicast/broadcast receiving group 120 illustrated in FIG. 1, according to an embodiment of the present invention. Although FIG. 8 representatively illustrates the first terminal User1 121, each of the second through Kth terminals User2 122 through UserK 123 illustrated in FIG. 1 may have the same structure.

Referring to FIG. 8, the first terminal User1 121 includes a CQI estimation unit, a CQI transmission unit 820, and a data reception unit 810.

The CQI estimation unit 810 estimates a CQI value using known symbols received through a pilot channel.

The CQI value is mapped to one of finite CQI levels each of which corresponds to the AMC options of a system or quantized levels of a reception SNR.

The CQI transmission unit 820 stores predetermined signal waveforms according to the CQI levels and transmits the predetermined signal waveform corresponding to the CQI level of the first terminal User1 121 to the base station 110 illustrated in FIG. 1 through a previously set common CQI feedback channel.

The base station 110 selects an AMC option of multicast/broadcast data based on the CQIs of from the first terminal User1 121 to the Kth terminal UserK 12K and transmits the multicast/broadcast data from the first terminal User1 121 to the Kth terminal UserK 12K. The data receiving unit 810 recovers the multicast/broadcast data transmitted by the base station 110 by performing demodulation 831 and channel decoding 832.

According to the present invention, in a multicast/broadcast service, service quality desired by terminals for receiving the same multicast/broadcast data may be satisfied by using the and a data rate may be improved.

Also, as a feedback channel for transmitting a CQI is not allocated with respect to each terminal and a common CQI feedback channel is shared by the terminals in a multicast/broadcast service receiving group for transmission of CQI levels, a feedback channel capacity may not be increased even when the number of terminals in a receiving group is increased.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for receiving multicast/broadcast data, the apparatus comprising:
 a channel quality indication (CQI) estimation unit for estimating a CQI of a plurality of terminals based on known symbols received through a common pilot channel;
 a CQI transmission unit for transmitting a predetermined signal waveform according to the CQI of the plurality of terminals through a previously set common CQI feedback channel;
 wherein a sum of predetermined signal waveforms having a channel quality indication (CQI) of each terminal from the plurality of terminals is received included in a multicast/broadcast service group via the previously set common CQI feedback channel; and
 a data reception unit for receiving multicast/broadcast data according to an adaptive modulation and coding (AMC) option selected from at least two or more AMC options, and
 wherein the selected AMC option is configured based on one of M finite CQI levels.

2. The apparatus of claim 1, wherein transmitting the predetermined signal waveform according to the CQI of the terminal through the previously set common CQI feedback channel comprises:
 mapping received SNR of the apparatus to said one of the M finite CQI levels;
 constructing the feedback channel with M different signal waveforms each of which corresponds to each of the M finite CQI levels; and
 transmitting the signal waveform over the previously set common CQI feedback channel.

3. The apparatus of claim 2, wherein the predetermined signal waveform corresponding to the CQI level of the terminal comprises a predetermined section of a time slot if the apparatus uses a time division multiplexing (TDM) method.

4. The apparatus of claim 2, wherein the predetermined signal waveform corresponding to the CQI level of the terminal comprises a predetermined subcarrier group if the apparatus uses an orthogonal frequency division multiplexing (OFDM) method.

5. The apparatus of claim 2, wherein the predetermined signal waveform corresponding to the CQI level of the terminal comprises a predetermined code sequence group if the apparatus uses a code division multiple access (CDMA) method.

6. The apparatus of any one of claims 3 through 5, wherein more time, subcarrier, or code resources are allocated to the predetermined signal waveform the lower the CQI level of the terminal, and less time, frequency, or code resources are allocated to the predetermined signal waveform based on the higher the respective CQI level of the terminal.

7. The apparatus of claim 2, wherein the M finite CQI levels correspond to the two M AMC options of the terminal.

8. The apparatus of claim 2, wherein the M finite CQI levels correspond to the M quantized levels of a received signal-to-noise ratio (SNR).

9. An apparatus for transmitting adaptive multicast/broadcast data, the apparatus comprising:
 a CQI detection unit for detecting two or more different channel quality indications (CQIs) of terminals comprised in a multicast/broadcast service group from received signal waveforms;
 wherein a sum of predetermined signal waveforms having a channel quality indication (CQI) of each terminal from a plurality of terminals included in a multicast/broadcast service group via a common CQI feedback channel;
 a controller for selecting a data rate by an adaptive modulation and coding (AMC) option based on one of the detected CQIs of the terminals; and
 a data transmission unit for transmitting the multicast/broadcast data by performing channel coding and modulation based on the AMC option selected by the controller.

10. The apparatus of claim 9, wherein a CQI of the apparatus is given by one of M finite CQI levels which correspond to M different signal waveforms.

11. The apparatus of claim 10, wherein the AMC option of the multicast/broadcast data is determined by a minimum value of the M CQI levels detected by the CQI detection unit.

12. A method of receiving multicast/broadcast data adaptively, the method comprising:

receiving known symbols through a common pilot channel;

estimating received SNR of a plurality of terminals based on the known symbols and mapping the received SNR of each of the plurality of terminals to at least two or more different CQI levels; wherein a sum of predetermined signal waveforms having a channel quality indication (CQI) of each terminal from the plurality of terminals included in a multicast/broadcast service group via a common CQI feedback channel;

allocating a predetermined signal waveform according to the respective CQI of the terminal and transmitting the predetermined signal waveform through a previously set common CQI feedback channel; and receiving multicast/broadcast data according to an AMC option selected at the base station, and wherein the AMC option selected from the at least two or more different CQI levels.

13. The method of claim 12, wherein the allocating of the predetermined signal waveform comprises:

mapping the CQI of the apparatus to one of M finite CQI levels;

corresponding M different waveforms to the CQI levels; and allocating the predetermined signal waveform corresponding to the CQI level of the terminal from among the M different waveforms.

14. The method of claim 13, wherein the M finite CQI levels correspond to M AMC options of the terminal.

15. The method of claim 13, wherein the M finite CQI levels correspond to a number of quantized levels of a received SNR.

16. The method of claim 13, wherein a data rate is adjusted based on a minimum value of the CQI level of the terminal.

17. The method of claim 13, wherein the CQI level of the terminal corresponds to an SNR of pilot symbols of the common pilot channel.

18. A method of transmitting multicast/broadcast data adaptively, the method comprising:

receiving a sum of predetermined signal waveforms having a channel quality indication (CQI) of each terminal from terminals included in a multicast/broadcast service group via a common CQI feedback channel;

restoring the CQIs from the predetermined received signal waveforms via the common CQI feedback channel; and transmitting the multicast/broadcast data based on an AMC option selected based on the restored CQIs of the terminals.

19. The method of claim 18, wherein a CQI of the adaptive multicast/broadcast service is divided into M finite CQI levels corresponding to M different waveforms, and the predetermined signal waveform corresponding to a CQI level of the terminal from among the M different signal waveforms is allocated.

* * * * *